(12) United States Patent
Bash et al.

(10) Patent No.: US 11,762,384 B2
(45) Date of Patent: Sep. 19, 2023

(54) SYSTEM AND METHOD FOR DYNAMICALLY ARMING A FAILSAFE ON A DELIVERY DRONE

(71) Applicant: Flytrex Aviation Ltd., Tel Aviv (IL)

(72) Inventors: Yariv Bash, Tel Aviv (IL); Amit Regev, Tel Aviv (IL)

(73) Assignee: FLYTREX AVIATION LTD., Tel Aviv (IL)

( * ) Notice: Subject to any disclaimer, the term of this patent is extended or adjusted under 35 U.S.C. 154(b) by 262 days.

(21) Appl. No.: 17/014,316

(22) Filed: Sep. 8, 2020

(65) Prior Publication Data

US 2020/0409357 A1    Dec. 31, 2020

Related U.S. Application Data

(63) Continuation-in-part of application No. 16/655,730, filed on Oct. 17, 2019, now Pat. No. 11,226,619,
(Continued)

(51) Int. Cl.
*G05D 1/00* (2006.01)
*B64C 39/02* (2023.01)
(Continued)

(52) U.S. Cl.
CPC ......... *G05D 1/0027* (2013.01); *B64C 39/024* (2013.01); *G05D 1/0094* (2013.01);
(Continued)

(58) Field of Classification Search
CPC .. G05D 1/0027; G05D 1/0094; G05D 1/0061; B64C 39/024; B64C 2201/128;
(Continued)

(56) References Cited

U.S. PATENT DOCUMENTS

| | | | |
|---|---|---|---|
| 5,799,263 A | 8/1998 | Culbertson | |
| 8,330,305 B2 | 12/2012 | Hart et al. | |

(Continued)

FOREIGN PATENT DOCUMENTS

| | | |
|---|---|---|
| BR | 112017021483 A2 | 7/2018 |
| CN | 107614375 A | 1/2018 |

(Continued)

OTHER PUBLICATIONS

The Supplementary European Search Report and Search Opinion for EP Application No. 17837369.2, Munich, Germany, dated Jan. 16, 2020.

(Continued)

*Primary Examiner* — Mahmoud S Ismail
(74) *Attorney, Agent, or Firm* — M&B IP Analysts, LLC (57) ABSTRACT

A system and method for safely terminating navigation of an unmanned aerial vehicle (UAV). A method includes generating a navigation plan for the UAV, the UAV including a propulsion system, wherein the navigation plan includes at least a start point, an end point, and a virtual three-dimensional (3D) tunnel connecting the start and end points; and configuring the UAV to execute the navigation plan by navigating from the start point to the end point, wherein the UAV is configured such that the UAV executes the navigation plan by navigating from the start point to the end point, wherein the UAV is further configured such that the UAV terminates navigation by terminating power to the propulsion system of the UAV and deploying a failsafe, wherein the UAV is configured to terminate navigation when the UAV is outside of the 3D tunnel.

21 Claims, 10 Drawing Sheets

Related U.S. Application Data which is a continuation-in-part of application No. 16/247,034, filed on Jan. 14, 2019, now Pat. No. 11,029,682, said application No. 16/655,730 is a continuation-in-part of application No. 16/247,034, filed on Jan. 14, 2019, and a continuation-in-part of application No. 15/649,133, filed on Jul. 13, 2017, now Pat. No. 10,719,086, said application No. 16/247,034 is a continuation of application No. 15/646,729, filed on Jul. 11, 2017, now Pat. No. 10,191,485, which is a continuation-in-part of application No. 15/447,452, filed on Mar. 2, 2017, now Pat. No. 10,274,949.

(60) Provisional application No. 62/897,614, filed on Sep. 9, 2019, provisional application No. 62/746,596, filed on Oct. 17, 2018, provisional application No. 62/361,505, filed on Jul. 13, 2016, provisional application No. 62/361,711, filed on Jul. 13, 2016, provisional application No. 62/326,787, filed on Apr. 24, 2016.

(51) Int. Cl.
  *G08G 5/00* (2006.01)
  *G06Q 10/0832* (2023.01)
  *B64U 101/60* (2023.01)

(52) U.S. Cl.
  CPC ......... *G08G 5/0013* (2013.01); *G08G 5/0034* (2013.01); *G08G 5/0043* (2013.01); *G08G 5/0069* (2013.01); *G08G 5/0082* (2013.01); *B64U 2101/60* (2023.01); *B64U 2201/20* (2023.01); *G05D 1/0061* (2013.01); *G06Q 10/0832* (2013.01)

(58) Field of Classification Search
  CPC ............ B64C 2201/146; G08G 5/0013; G08G 5/0034; G08G 5/0043; G08G 5/0069; G08G 5/0082; G06Q 10/0832
  USPC ............................................................ 701/2
  See application file for complete search history.

(56) References Cited

U.S. PATENT DOCUMENTS

| | | | |
|---|---|---|---|
| 8,612,136 | B2 | 12/2013 | Levine et al. |
| 8,615,473 | B2 | 12/2013 | Spiegel et al. |
| 8,718,910 | B2 | 5/2014 | Guéziec |
| 8,914,182 | B2 | 12/2014 | Casado et al. |
| 9,082,293 | B2 | 7/2015 | Wellman et al. |
| 9,102,406 | B2 | 8/2015 | Stark et al. |
| 9,221,538 | B2 | 12/2015 | Takahashi et al. |
| 9,368,026 | B1 | 6/2016 | Herbach et al. |
| 9,731,839 | B1 | 8/2017 | Beckman et al. |
| 9,852,642 | B2 | 12/2017 | Butler et al. |
| 10,372,142 | B2 | 8/2019 | Venturelli |
| 2004/0044444 | A1* | 3/2004 | Johnson ............... G05D 1/0055 244/175 |
| 2006/0161440 | A1 | 7/2006 | Nakayama et al. |
| 2008/0300737 | A1 | 12/2008 | Sacle et al. |
| 2010/0070124 | A1 | 3/2010 | Yeager et al. |
| 2012/0237028 | A1 | 9/2012 | Khazan et al. |
| 2013/0096818 | A1 | 4/2013 | Vicharelli et al. |
| 2013/0261945 | A1* | 10/2013 | Marcy .................. G08G 5/0008 701/121 |
| 2014/0032034 | A1 | 1/2014 | Raptopoulos et al. |
| 2014/0254896 | A1 | 9/2014 | Zhou et al. |
| 2014/0339372 | A1* | 11/2014 | Dekel ..................... B64C 29/00 244/7 R |
| 2015/0073624 | A1 | 3/2015 | Takahashi et al. |
| 2015/0154136 | A1 | 6/2015 | Markovic et al. |
| 2015/0370251 | A1 | 12/2015 | Siegel et al. |
| 2015/0379874 | A1 | 12/2015 | Ubhi et al. |
| 2016/0018230 | A1 | 1/2016 | Neubecker et al. |
| 2016/0033966 | A1 | 2/2016 | Farris et al. |
| 2016/0039300 | A1 | 2/2016 | Wang et al. |
| 2016/0068264 | A1 | 3/2016 | Ganesh et al. |
| 2016/0070264 | A1 | 3/2016 | Hu et al. |
| 2016/0125735 | A1 | 5/2016 | Tuukkanen |
| 2016/0189549 | A1 | 6/2016 | Marcus |
| 2016/0260332 | A1* | 9/2016 | Downey .............. G05D 1/0022 |
| 2016/0274578 | A1 | 9/2016 | Arwine |
| 2016/0371987 | A1 | 12/2016 | Kotecha |
| 2017/0011340 | A1 | 1/2017 | Gabbai |
| 2017/0013413 | A1 | 1/2017 | Singh et al. |
| 2017/0090484 | A1 | 3/2017 | Obaidi |
| 2017/0129603 | A1* | 5/2017 | Raptopoulos ........ G08G 5/0069 |
| 2017/0225792 | A1 | 8/2017 | Wang et al. |
| 2017/0235018 | A1 | 8/2017 | Foster et al. |
| 2017/0316621 | A1 | 11/2017 | Jefferies et al. |
| 2018/0044000 | A1 | 2/2018 | Venturelli et al. |
| 2018/0047295 | A1 | 2/2018 | Ricci |
| 2018/0188747 | A1 | 7/2018 | Venturelli |
| 2018/0253979 | A1 | 9/2018 | Rey et al. |
| 2018/0356841 | A1 | 12/2018 | Zilberstein et al. |

FOREIGN PATENT DOCUMENTS

| | | |
|---|---|---|
| CN | 107924190 A | 4/2018 |
| CN | 109956041 A | 7/2019 |
| EP | 2767962 A1 | 8/2014 |
| EP | 3280638 A4 | 12/2018 |
| EP | 3314344 A4 | 2/2019 |
| IN | 201727035253 | 12/2017 |
| MX | 2017012941 A | 11/2018 |
| RU | 2217797 C2 | 11/2003 |
| WO | 2015061008 A1 | 4/2015 |
| WO | 2015160672 A1 | 10/2015 |
| WO | 2016164416 A1 | 10/2016 |
| WO | 2016210156 A1 | 12/2016 |

OTHER PUBLICATIONS

The Third European Office Action for European Patent Application No. 17837369.2 dated May 27, 2021, EPO, Munich, Germany.

The European Search Report for EP Application No. 17837369.2, The European Patent Office, The Hague: dated Jan. 23, 2020.

The International Search Report and the Written Opinion for PCT/US2017/041514, ISA/RU, Moscow, Russia, dated Apr. 12, 2018.

Notice of Deficiencies for European Patent Application No. 17837369.2, dated Jan. 15, 2021, EPO, Munich, Germany.

The Fourth European Office Action for European Patent Application No. 17837369.2, dated Oct. 8, 2021, EPO, Munich, Germany.

Notice of Deficiencies for European Patent Application No. 17837369.2, dated Sep. 3, 2020, EPO, Munich, Germany.

* cited by examiner

SYSTEM AND METHOD FOR DYNAMICALLY ARMING A FAILSAFE ON A DELIVERY DRONE

CROSS-REFERENCE TO RELATED APPLICATIONS

This application claims the benefit of U.S. Provisional Application No. 62/897,614 filed on Sep. 9, 2019.

This application is also a continuation-in-part (CIP) of U.S. patent application Ser. No. 16/247,034 filed on Jan. 14, 2019. The Ser. No. 16/247,034 application is a continuation of U.S. patent application Ser. No. 15/646,729 filed on Jul. 11, 2017, now U.S. Pat. No. 10,191,485, which claims the benefit of U.S. Provisional Application No. 62/361,711 filed on Jul. 13, 2016. The Ser. No. 15/646,729 application is also a CIP of U.S. patent application Ser. No. 15/447,452 filed on Mar. 2, 2017, now U.S. Pat. No. 10,274,949, which claims the benefit of U.S. Provisional Application No. 62/326,787 filed on Apr. 24, 2016.

This application is also a CIP of U.S. patent application Ser. No. 16/655,730 filed on Oct. 17, 2019, which claims the benefit of U.S. Provisional Patent Application No. 62/746,596 filed on Oct. 17, 2018. The Ser. No. 16/655,730 application is a CIP of the Ser. No. 16/247,034 application and of U.S. patent application Ser. No. 15/649,133 filed on Jul. 13, 2017, now U.S. Pat. No. 10,719,086. The Ser. No. 15/649,133 application claims the benefit of U.S. Provisional Application No. 62/361,505 filed on Jul. 13, 2016.

The contents of the above-referenced applications are hereby incorporated by reference.

TECHNICAL FIELD

The disclosure generally relates to unmanned aerial vehicles and, particularly, to a failsafe of the same.

BACKGROUND

The approaches described in this section are approaches which could be pursued, but not necessarily approaches which have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

While unmanned aerial vehicles, known colloquially as drones, are increasingly seen as an economically viable and competitive method of last-mile delivery, regulatory authorities have been slow to adopt these technologies for civilian use due to safety and security concerns. One such concern is how deviation of a drone from navigational plans is handled. It would therefore be advantageous to provide a failsafe for increasing civilian safety for drone usage. Additionally, it may be advantageous to provide a failsafe that is not integral to a drone, making safety certification easier and more cost-effective.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for safely terminating navigation of an unmanned aerial vehicle (UAV). The method comprises generating a navigation plan for the UAV, the UAV including a propulsion system, wherein the navigation plan includes at least a start point, an end point, and a virtual three-dimensional (3D) tunnel connecting the start and end points; and configuring the UAV to execute the navigation plan by navigating from the start point to the end point, wherein the UAV is configured such that the UAV executes the navigation plan by navigating from the start point to the end point, wherein the UAV is further configured such that the UAV terminates navigation by terminating power to the propulsion system of the UAV and deploying a failsafe, wherein the UAV is configured to terminate navigation when the UAV is outside of the 3D tunnel.

Certain embodiments disclosed herein also include a non-transitory computer readable medium having stored thereon instructions for causing a processing circuitry to execute a process, the process comprising: generating a navigation plan for the UAV, the UAV including a propulsion system, wherein the navigation plan includes at least a start point, an end point, and a virtual three-dimensional (3D) tunnel connecting the start and end points; and configuring the UAV to execute the navigation plan by navigating from the start point to the end point, wherein the UAV is configured such that the UAV executes the navigation plan by navigating from the start point to the end point, wherein the UAV is further configured such that the UAV terminates navigation by terminating power to the propulsion system of the UAV and deploying a failsafe, wherein the UAV is configured to terminate navigation when the UAV is outside of the 3D tunnel.

Certain embodiments disclosed herein also include a system for safely terminating navigation of an unmanned aerial vehicle (UAV). The system comprises: a processing circuitry; and a memory, the memory containing instructions that, when executed by the processing circuitry, configure the system to: generate a navigation plan for the UAV, the UAV including a propulsion system, wherein the navigation plan includes at least a start point, an end point, and a virtual three-dimensional (3D) tunnel connecting the start and end points; and configure the UAV to execute the navigation plan by navigating from the start point to the end point, wherein the UAV is configured such that the UAV executes the navigation plan by navigating from the start point to the end point, wherein the UAV is further configured such that the UAV terminates navigation by terminating power to the propulsion system of the UAV and deploying a failsafe, wherein the UAV is configured to terminate navigation when the UAV is outside of the 3D tunnel.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

In order to increase civilian safety when utilizing drone delivery systems, a failsafe is coupled to a drone. Cutting power to the drone, terminating navigational plans, and deploying parachutes and airbags ensure that a heavy drone does not fall in places where people may be. While parachute systems can ensure lessened impact of a falling drone, detection of deviation of the drone itself from an intended point of delivery will increase safety, provide a more efficient failsafe, and provide a way of ensuring that the route taken by the drone is the safest with respect to civilians and property.

Figure 1A:
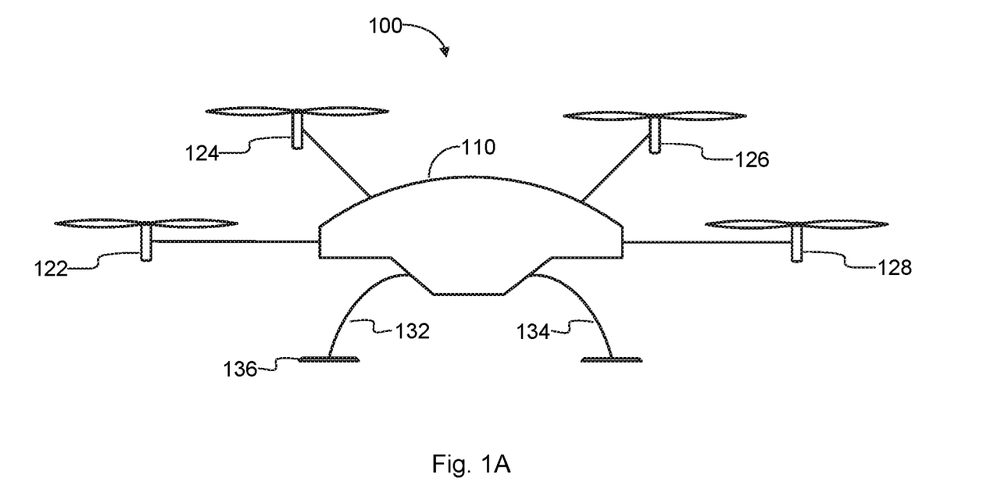
FIG. 1A is a schematic illustration of an unmanned aerial vehicle (UAV), in accordance with an embodiment.

FIG. 1A is an example schematic illustration of an unmanned aerial vehicle (UAV) 100, in accordance with an embodiment. The UAV 100 (also referred to as a "drone" 100) includes a body 110 for housing therein a controller (not shown in FIG. 1A) and a navigation termination module (NTM). The UAV 100 is adapted to couple with a payload (not shown). The controller may be coupled to a communication circuit for communicating with a control server (such as the control server 300, FIG. 4) over a network, as discussed in greater detail in FIG. 4 below.

The body 110 is coupled with a plurality of rotors. In the example implementation shown in FIGS. 1A-C, the rotors include a first rotor 122, a second rotor 124, a third rotor 126, and a fourth rotor 128. In an example implementation, one pair of rotors, for example the first rotor 122 and the third rotor 126, will turn clockwise, while a second pair of rotors, for example the second rotor 124 and the fourth rotor 128, will turn counter-clockwise. In another example implementation, the rotors have a fixed pitch, and height, yaw, pitch, and roll are adjusted by applying varying power to each rotor as the situation requires.

In some embodiments, the UAV 100 may further include a pair of landing skids 132 and 134. In certain embodiments, the landing skids may be equipped with dampers, such as the damper 136. Dampers assist in shock absorption in landing the UAV, allowing for protection of a UAV payload, and protection of, for example, the controller.

Figure 1B:
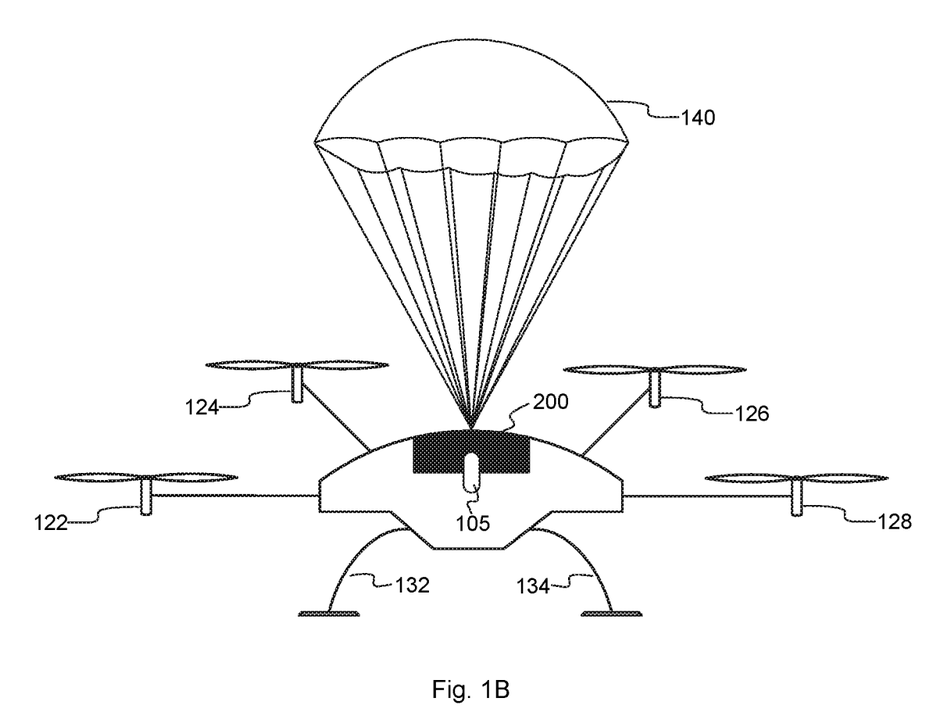
FIG. 1B is a schematic illustration of a UAV coupled with a navigation termination module (NTM), implemented in accordance with an embodiment.

FIG. 1B is an example schematic illustration of a UAV 100 coupled with an NTM 200, implemented in accordance with an embodiment. In an example implementation, the UAV 100 may include a terminal (not shown) for coupling external devices such as sensors, cameras, payloads, and the like. The NTM 200 may be physically coupled with the UAV 100 through such a terminal and, in some embodiments, may be further fastened with a latch 105 to the UAV body 110. In certain embodiments, the NTM 200 may be connected to a bus (not shown) of the UAV 100 to further receive signals, flight information, or both from one or more sensors of the UAV 100. The NTM 200 is configured to receive data from one or more inputs and determine when to initiate a navigation termination protocol, which includes cutting power to the UAV's propelling system and deploying a protection device, such as a parachute 140.

Figure 1C:
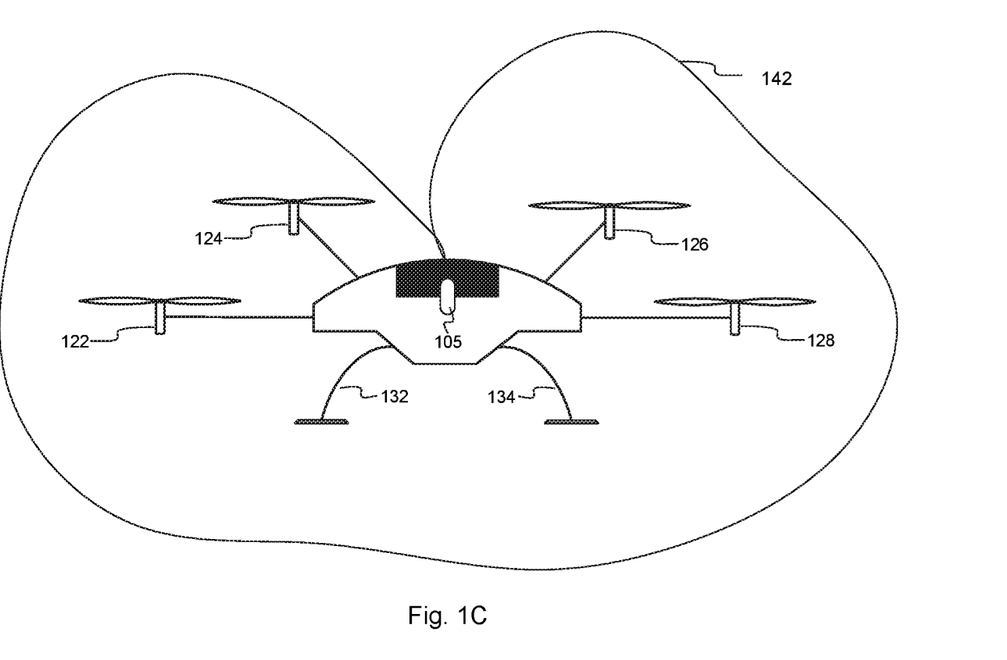
FIG. 1C is a schematic illustration of a UAV coupled with a navigation termination module (NTM), implemented in accordance with an embodiment.

FIG. 1C is an example schematic illustration of a UAV 100 coupled with an NTM 200, implemented in accordance with an embodiment. In an example implementation, the UAV 100 may include a terminal (not shown) for coupling external devices, such as sensors, cameras, payloads, and the like. The NTM 200 may be physically coupled with the UAV 100 through such a terminal, for example, and, in some embodiments, be further fastened with a latch 105 to the UAV body 110. In certain embodiments, the NTM 200 may be connected to a bus (not shown) of the UAV to further receive signals, flight information, or both from one or more sensors of the UAV. The NTM 200 is configured to receive data from one or more inputs and determine when to initiate a navigation termination protocol, which includes cutting power to the UAV's 100 propelling system and deploying a protection device, such as an airbag 142.

In another embodiment, initiation of navigation termination protocol may include only cutting power to the UAV's propelling system without deployment of a protection device, such as a parachute or airbag, thereby causing the UAV to fall to the ground. This may be advantageous, for example, to minimize drift of the UAV. As an example, if the UAV navigation termination protocol is initiated over a river body, such as a concrete channel of the Los Angeles River, which is mostly unoccupied by people, it may be safer to terminate navigation and cause the UAV to descend into the river rather than deploy a parachute which can drift with wind conditions to an area which is, by contrast, occupied by people. Avoiding people is naturally safer when dealing with such machinery.

Figure 2:
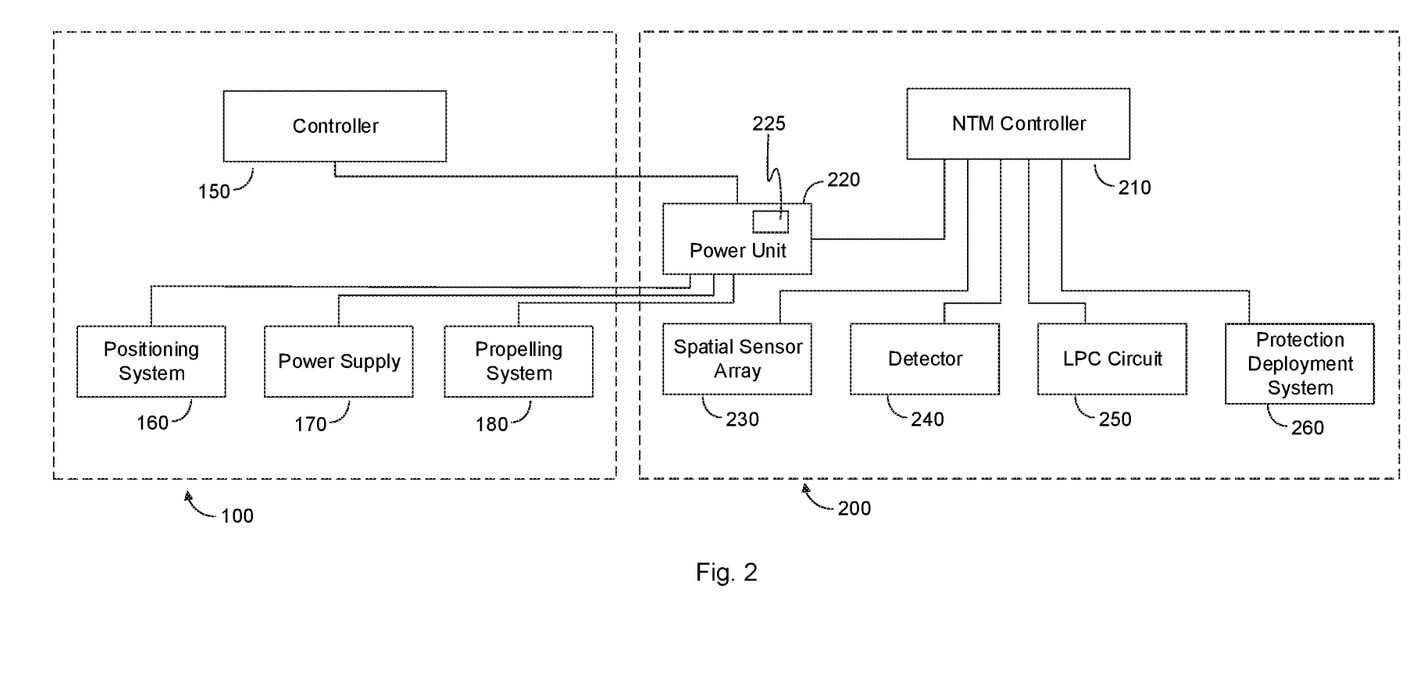
FIG. 2 is a schematic illustration of a navigation termination module (NTM) coupled with an unmanned vehicle (UAV) system, implemented in accordance with an embodiment.

FIG. 2 is an example schematic illustration of a navigation termination module (NTM) 200 coupled with an unmanned vehicle (UAV) 100 system, implemented in accordance with an embodiment. A UAV 100 is described in more detail with respect to FIG. 1A above. The UAV 100 includes a controller 150 for controlling the various functions of the UAV. The controller 150 may include at least one processing circuitry (not shown in FIG. 2), for example, a central processing unit (CPU). In an embodiment, the processing circuitry may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry may be coupled via a bus to a memory (not shown in FIG. 2). The memory may include a memory portion that contains instructions that, when executed by the processing circuitry, performs at least a portion of the embodiments described in more detail herein. The memory may be further used as a working scratch pad for the processing element, a temporary storage, and the like, as the case may be. The memory may be a volatile memory such as, but not limited to, random access memory (RAM), or non-volatile memory (NVM), such as, but not limited to, flash memory.

The processing circuitry, the memory, or both, may also include machine-readable media for storing software. Software shall be construed broadly to mean any type of instructions, whether referred to as software, firmware, middleware, microcode, hardware description language, or otherwise. Instructions may include code, such as, without limitation, in source code format, binary code format, executable code format, or any other suitable format of code. The instructions, when executed by the one or more processors, cause the processing circuitry to perform at least a portion of the various functions described in further detail herein.

In an embodiment, the controller 150 is coupled with a positioning system 160, a power supply 170, and a propelling system 180. A positioning system 160 may be, for example, a GPS module, GPS being an example of a satellite navigation system. A power supply 170 may include an energy storage, such as a rechargeable battery. The power supply 170 may include, in some embodiments, a photovoltaic array coupled with an energy storage. A propelling system 180 is operative for propelling the UAV 100. The propelling system 180 may include, for example, one or more motors, an engine, and the like.

In the example implementation shown in FIG. 2, the controller 150 is coupled with a power unit 220 of an NTM 200. The power unit 220 includes a circuit breaker 225 for cutting power from the power supply 170 to the propelling system 180. The power unit 220 may be further configured to supply power to the NTM 200.

The NTM controller 210 may include a processing circuitry (not shown in FIG. 2), for example, a central processing unit (CPU). In an embodiment, the processing circuitry may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry may be coupled, via a bus, to a memory (not shown in FIG. 2). The memory may include a memory portion which contains instructions which, when executed by the processing element, performs the methods described in greater detail herein. The memory may be further used as a working scratch pad for the processing element, as a temporary storage, and the like, as the case may be. The memory may be a volatile memory such as, but not limited to, random access memory (RAM), or non-volatile memory (NVM), such as, but not limited to, flash memory.

The processing circuitry, the memory, or both, may also include machine-readable media for storing software. Software shall be construed broadly to mean any type of instructions, whether referred to as software, firmware, middleware, microcode, hardware description language, or otherwise. Instructions may include code, such as, without limitation, in source code format, binary code format, executable code format, or any other suitable format of code. The instructions, when executed by the one or more processors, cause the processing circuitry to perform at least a portion of the various functions described in further detail herein.

The NTM 200 further includes a spatial sensor array 230. The spatial sensor array 230 may include, in an embodiment, one or more accelerometers (not shown). The NTM 200 may further include a detector 240, such as a RADAR system, an optical sensor, or combinations thereof. The NTM 200 includes a communication circuit, such as a low power communication (LPC) circuit 250. In an embodiment, the LPC 250 may further use an authentication system (not shown) for authenticating received instructions. In some embodiments, instructions may include a sequence, for example, of bits, which is unique to one specific UAV. The received instructions may be sent from an authorized node, such as a server or user device.

The NTM 200 also includes a protection deployment system (PDS) 260. Upon initiating a navigation termination, the NTM controller 210 configures a circuit breaker 225 of the power unit 220 to break the circuit between the power supply 170 and the propelling system 180. As the vehicle may be a danger to itself and to other property, humans, or both, the NTM controller 210 initiates the PDS 260. The PDS 260 is configured to, in an embodiment, deploy a parachute capable of, for example, decreasing the descent rate of a drone. In some embodiments, the PDS 260 may include one or more airbags which absorb the energy of the drone upon impact. In an embodiment, the NTM controller 210 may configure the PDS 260 to be armed or disarmed. In a disarmed state, the PDS 260 will not deploy upon navigation termination. In certain embodiments, the power unit 220 is optional, but the NTM controller 210 retains the ability to arm and disarm the PDS 260. In some embodiments, the NTM 200 may be integrated as part of the drone 100 and, in such embodiments the controller 150 and the NTM controller 210 may be a single controller unit.

Figure 3:
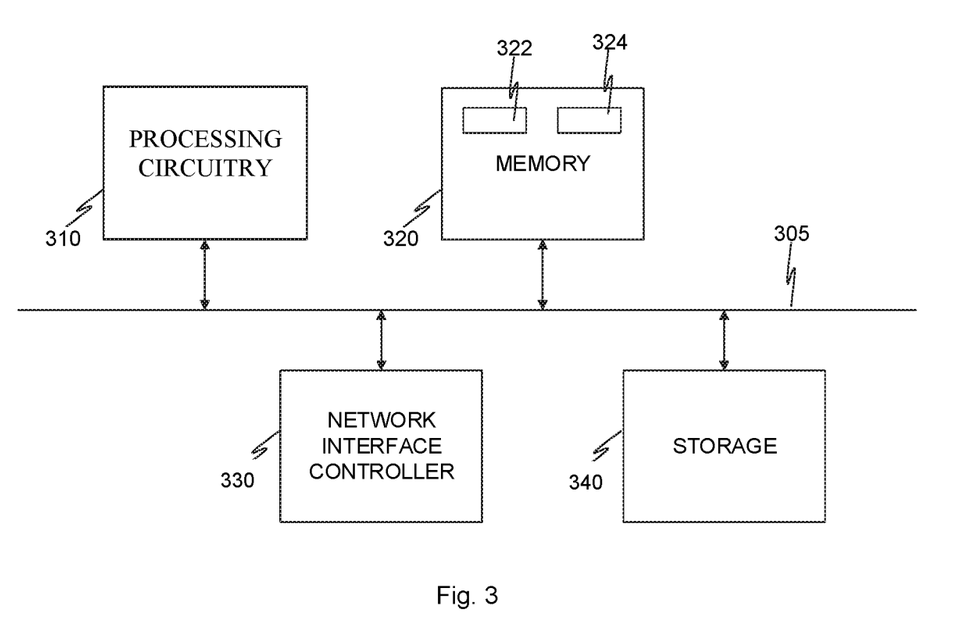
FIG. 3 is a schematic illustration of a UAV control server implemented in accordance with an embodiment.

FIG. 3 is an example schematic illustration of a UAV control server 300 implemented according to an embodiment. The server 300 includes at least one processing circuitry 310, for example, a central processing unit (CPU). In an embodiment, the processing circuitry 310 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 310 is coupled via a bus 305 to a memory 320. The memory 320 may include a memory portion 322 that contains instructions which, when executed by the processing circuitry 310, configures the processing circuitry 310 to perform at least a portion of the embodiments described herein. The memory 320 may be further used as a working scratch pad for the processing circuitry 310, as a temporary storage, and the like, as the case may be. The memory 320 may be a volatile memory such as, but not limited to, random access memory (RAM), or non-volatile memory (NVM), such as, but not limited to, flash memory. Memory 320 may further include a memory portion 324 containing navigation instructions for one or more UAVs, the navigation plans including a takeoff point (i.e. coordinates of a takeoff point) and delivery location (i.e. coordinates of a delivery location).

The processing circuitry 310 may be coupled to a network interface controller (NIC) 330. The NIC 330 is operative for connecting the UAV control server 300 to a network, over which the server 300 can communicate instructions to one or more UAVs, such as UAV 100 of FIG. 1A. The processing circuitry 310 may be further coupled with a storage 340. Storage 340 may be used for the purpose of holding a copy of the method executed in accordance with the disclosed technique.

The processing circuitry 310, the memory 320, or both, may also include machine-readable media for storing software. Software shall be construed broadly to mean any type of instructions, whether referred to as software, firmware, middleware, microcode, hardware description language, or otherwise. Instructions may include code, such as, without limitation, in source code format, binary code format, executable code format, or any other suitable format of code. The instructions, when executed by the one or more processors, cause the processing circuitry 310 to perform the various functions described in further detail herein.

Figure 4:
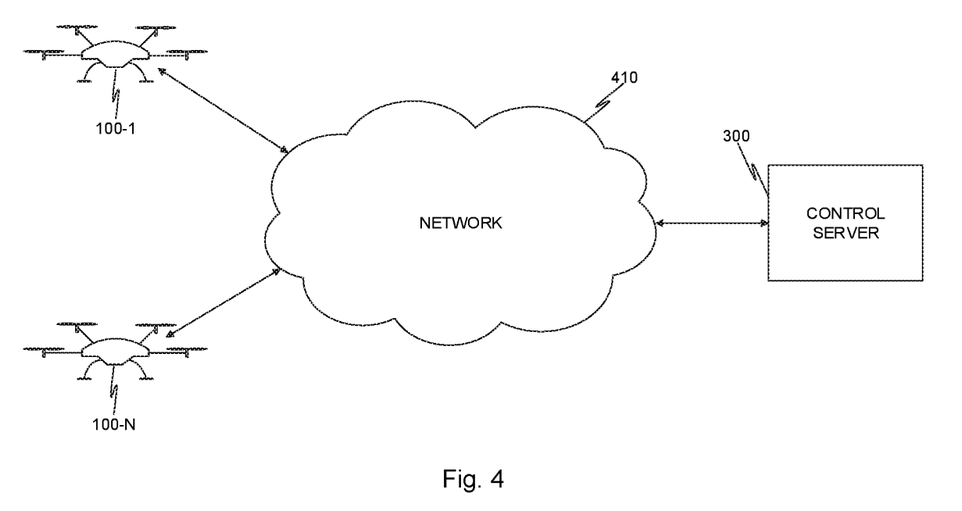
FIG. 4 is a network diagram illustrating a control server controlling a plurality of UAVs over a network utilized to describe various disclosed embodiments.

FIG. 4 is an example schematic illustration of a control server 300 communicating with a plurality of UAVs 100-1 through 100-N over a network 410, implemented in accordance with an embodiment. A control server 300 is communicatively coupled with a network 410. In an embodiment, the network 410 may be configured to provide connectivity of various sorts, as may be necessary, including, but not limited to, wired connectivity, wireless connectivity, or both, including, for example, a local area network (LAN), a wide area network (WAN), a metro area network (MAN), the worldwide web (WWW), the Internet, and the like, as well as any combination thereof, as well as cellular connectivity.

The network 410 further provides wireless communication for a plurality of UAVs 100-1 through 100-N, where 'N' is an integer having a value of '2' or greater.

The control server 300 may send, over the network 410, to each of the drones 100, a navigation plan, and other instructions, as needed. For example, the control server 300 may instruct a drone 100 to release a package or payload, to abort a navigation plan, to arm or disarm a PDS, and the like. In some embodiments, the drones 100 and the control server 300 may include an authentication module to verify instructions received by a drone 100 from the control server 300.

Figure 5A:
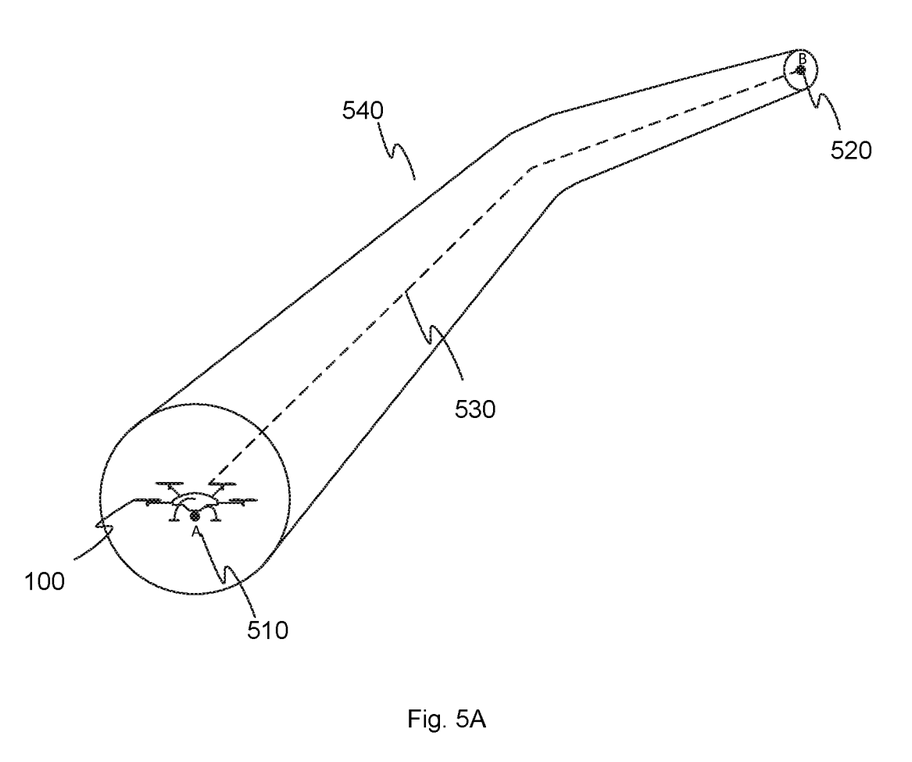
FIG. 5A is a schematic illustration of an isometric view of a navigation plan received from a control server implemented in accordance with an embodiment.

FIG. 5A is an example schematic illustration of an isometric view of the navigation plan received from a control server implemented in accordance with an embodiment. The figure shows the defined boundaries of the 3D shape 540 delineating the geofence "tunnel" through which the drone 100 can safely fly.

Figure 5B:
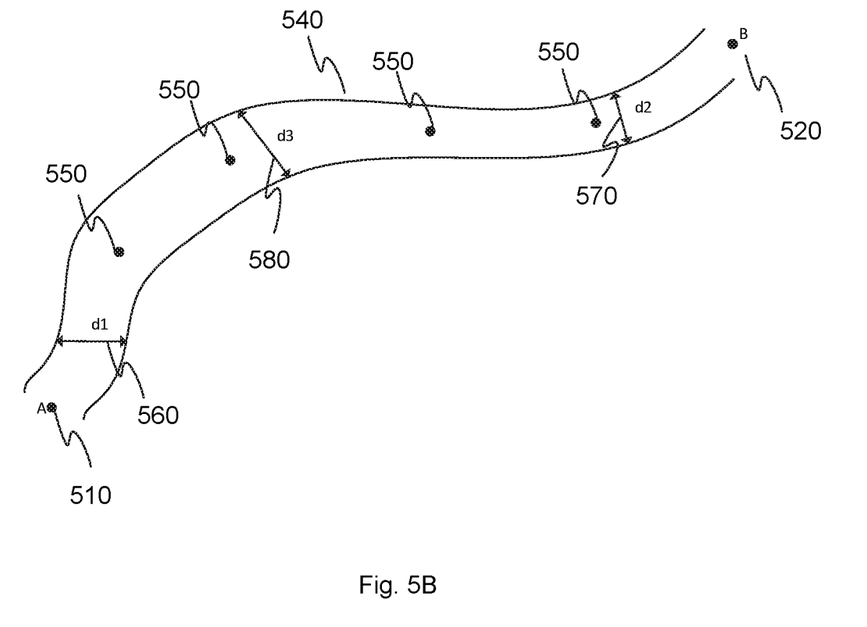
FIG. 5B is a schematic illustration of a top view of the navigation plan received from a control server implemented in accordance with an embodiment

FIG. 5B is an example schematic illustration of a top view of the navigation plan received from a control server implemented in accordance with an embodiment. The satellite-based navigation system coordinates (henceforth, "GPS coordinates" 550), are a number of points along the predetermined route of the drone 100. The coordinates 550 plot the path from start point "A" 510 to end point "B" 520, and not only define the route of the drone 100, from start to end, but also define a geofence boundary 3D shape 540 as the width of the "tunnel" can be defined and measured according to these GPS coordinates 550. Examples of width measurements are illustrated by points d1, d2, and d3 (560, 570, and 580, respectively).

Referring now to FIG. 5A or B, a drone 100 is configured by a control server to takeoff from start point "A" 510 and land in end point "B" 520. Points 510 and 520 are 3D GPS coordinates in this example. Between points "A" 510 and "B" 520, a direct path 530 may be generated so that the drone completes the shortest distance possible between point "A" 510 and point "B" 520. The start point and end point may have many points in between, any of which may have a direct path generated between them. A 3D shape 540 is defined around those points along the path. The shape defines a geofence within which the drone is allowed to fly. If the drone deviates from inside the area of the shape, or crosses the boundary of the geofence, the failsafe is triggered. The NTM (not shown) is configured to receive data based on the GPS coordinates and surrounding geofence and determines when to initiate a navigation termination protocol, which includes cutting power to the UAV's propelling system and, optionally, deploying a protection device or landing mechanism such as a parachute. In another embodiment, the protection device or landing mechanism is an airbag which envelops the drone.

Figure 6:
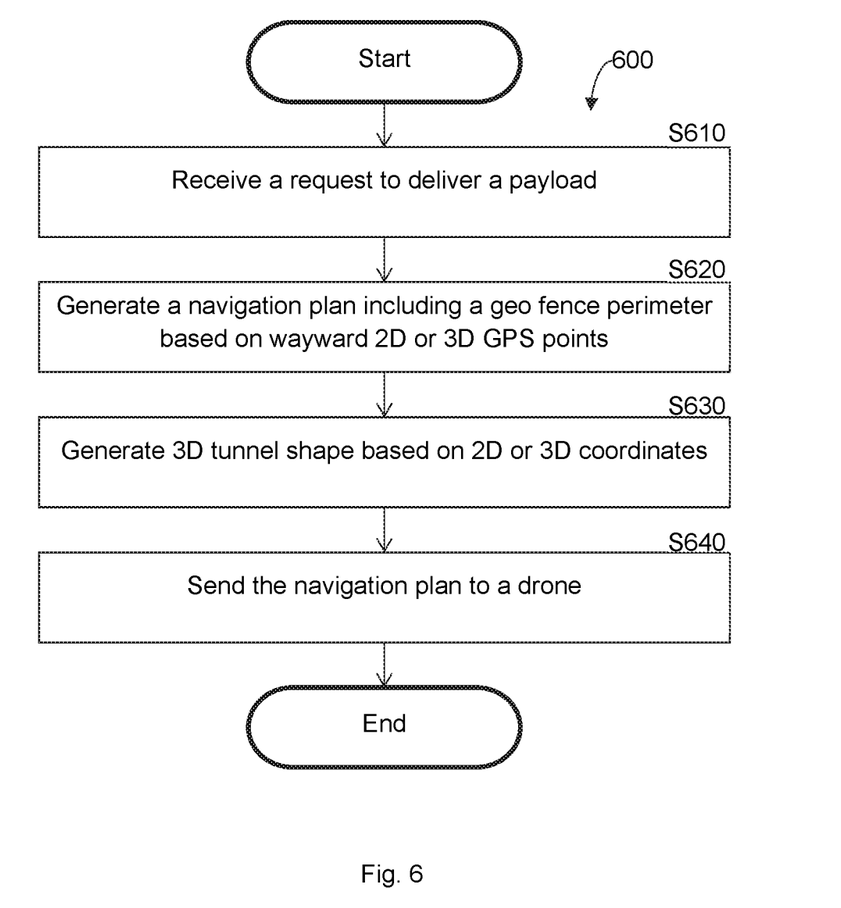
FIG. 6 is a flowchart of a computerized method for generation of a navigational plan of a delivery drone, implemented in accordance with an embodiment.

FIG. 6 is an example flowchart 600 of a computerized method for generation of a navigational plan of a delivery drone, implemented in accordance with an embodiment. In an embodiment, the method is performed by the control server 300. The flowchart 600 provides a method for safely In S610, a request to deliver a payload to a destination is received. The destination may be received as 2D or 3D GPS coordinates, for example, which can be transferred to a positioning system of the delivery drone.

In S620, a navigation plan is generated for the UAV. In an embodiment, the navigation plan includes an origin start point and a destination end point. The origin and destination include 2D or 3D GPS coordinates.

In S630, a tunnel is generated. The tunnel is a 3D space defined by a perimeter around a generated path between the origin and the destination, which can serve as a symmetry axis. The drone can move freely within the 3D space. Exiting the 3D space results in triggering of the NTM. In an embodiment, the drone may exit the tunnel space for a predefined period of time without triggering the NTM. For example, the NTM may be triggered only if the drone exits the tunnel space for a period of time exceeding five seconds. In another embodiment, the predefined period of time may be cumulative such that the drone may spend no more than a total predefined time outside the tunnel. In such an example, where the predefined time is five seconds, the drone exits once for three seconds, and then again for over two seconds. The second exit, once the two second time limit is reached, results in triggering the NTM.

In another embodiment the server generates a 3D space which is time sensitive in real-time. For example, the drone can move freely within the 3D space within a certain and predetermined time frame, such as from 16:00 until 16:32. After this time frame, the 3D space disappears and NTM may be triggered. In another embodiment, the server generates a 3D space which exists only for a limited amount of time relative to a starting time. For example, once the UAV has taken off, a time frame of, for example, thirty-two minutes is defined, in which time frame the UAV has to reach its destination. After this time frame expires, the 3D space disappears and the NTM may be triggered.

In S640, the navigation plan is updated to include the tunnel and utilized to configure the UAV to navigate in accordance with the disclosed embodiments. The navigation plan may be displayed on a display of a user operating, for example, the control server. In an embodiment, the navigation plan is sent to the UAV such that, when the navigation plan is executed by the UAV, the UAV becomes configured to navigate and to terminate navigation in accordance with the disclosed embodiments. In another embodiment, the navigation plan is configured by the drone itself by an on board CPU.

Figure 7:
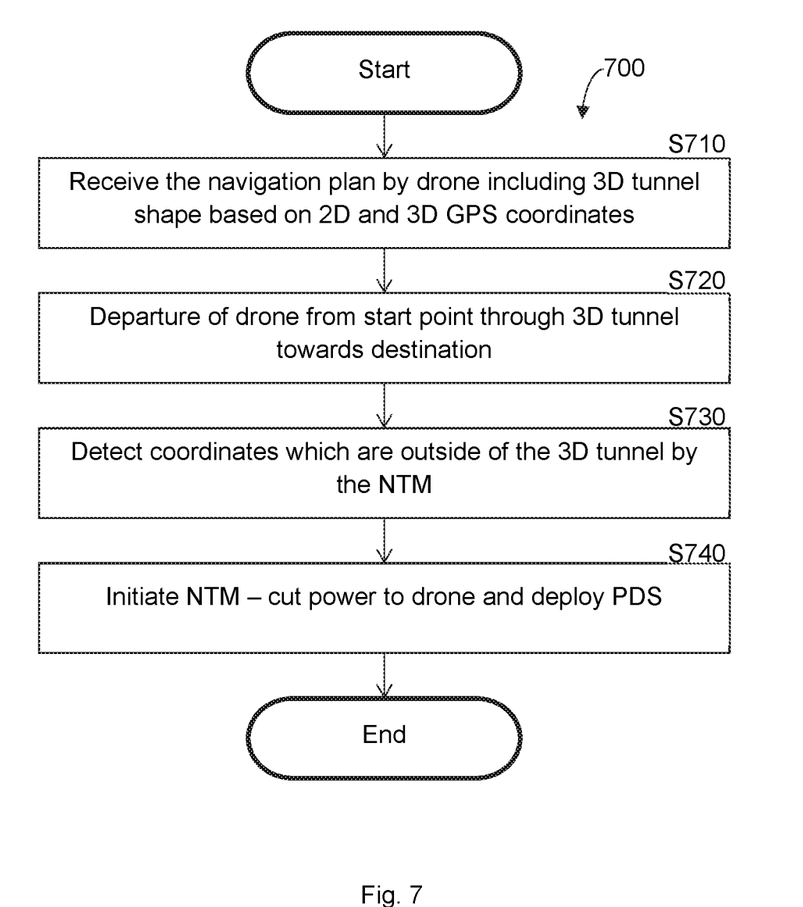
FIG. 7 is a flowchart of a computerized method for deployment of a fail-safe mechanism, implemented in accordance with an embodiment.

FIG. 7 is an example flowchart 700 of a computerized method for deployment of a PDS fail-safe mechanism, implemented in accordance with an embodiment. In an embodiment, the method is performed by a drone 100.

In S710, the drone receives navigation plan from a control server. Included in the navigation plan is a 3D tunnel generated by 2D and 3D way points from an origin at a start point to a destination at an end point. The 3D tunnel defines an outer boundary for movements of the drone in 3D space, and may further include one or more temporal components. The temporal components may define an amount of time during which the drone is allowed to be outside of the 3D tunnel, which may be further defined as an amount of time in which the drone can be continuously outside of the 3D tunnel, a total amount of time in which the drone can be outside of the 3D tunnel, both, and the like.

In another embodiment, S710 includes generating the navigation plan by the drone. To this end, S710 may further include receiving any of the origin, the destination, a 3D map of a geographical area including the origin and the destination, a combination thereof, and the like.

In S720, upon instruction from the control server, the drone takes off from start point and flies through the 3D tunnel towards end point.

In S730, an NTM of the drone is activated. In an embodiment, the NTM of the drone is activated when coordinates of the drone which are outside of the 3D tunnel are detected. To this end, S730 further includes monitoring the location of the drone via measurements relative to the 3D tunnel and determining when the drone has deviated from the path of the 3D tunnel, an amount of time by which the drone has deviated from the path of the 3D tunnel, both, and the like.

In an embodiment, the NTM may be activated after a threshold of time has been crossed, such as, for example if the drone is outside the tunnel for over three seconds.

In S740, when the NTM has been activated the NTM is initiated, resulting in termination of power to the drone, as well as PDS deployment.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for safely terminating navigation of an unmanned aerial vehicle (UAV), comprising:
    generating a navigation plan for the UAV, the UAV including a propulsion system, wherein the navigation plan includes at least a start point, an end point, and a virtual three-dimensional (3D) tunnel connecting the start and end points, wherein the 3D tunnel includes a plurality of widths;
    determining a path between the start point and the end point, wherein the path includes a plurality of points along the path, wherein each width of the plurality of widths of the 3D tunnel is defined based on a respective point of the plurality of points; and
    configuring the UAV to execute the navigation plan by navigating from the start point to the end point, wherein the UAV is configured such that the UAV executes the navigation plan by navigating from the start point to the end point, wherein the UAV is further configured such that the UAV terminates navigation by terminating power to the propulsion system of the UAV and deploying a failsafe, wherein the UAV is configured to terminate navigation when the UAV is outside of the 3D tunnel.

2. The method of claim 1, wherein the failsafe is adapted to protect the UAV from damage due to falling.

3. The method of claim 2, wherein the failsafe protects the UAV from damage due to falling by reducing drift of the UAV.

4. The method of claim 2, wherein the failsafe includes at least one of: an airbag, and a parachute.

5. The method of claim 1, wherein the UAV is configured such that the navigation is terminated at the first time in which the UAV is outside of the 3D tunnel.

6. The method of claim 1, wherein the UAV is configured such that the navigation is terminated when a total amount of time during which the UAV is outside of the 3D tunnel exceeds a threshold.

7. The method of claim 1, wherein configuring the UAV to execute the navigation plan further comprises:
arming a protective deployment system of the UAV, wherein the protective deployment system of the UAV is configured to deploy the failsafe upon navigation termination when the protective deployment system is armed.

8. The method of claim 7, further comprising:
disarming the protective deployment system of the UAV such that the protective deployment system is configured not to deploy the failsafe upon navigation termination when the protective deployment system is disarmed.

9. The method of claim 1, wherein generating the navigation plan further comprises:
defining a 3D perimeter around the determined path, wherein the 3D tunnel is the 3D perimeter.

10. The method of claim 9, wherein the 3D perimeter around the determined path is defined based on the plurality of widths.

11. The method of claim 1, wherein the determined path is a symmetry axis of the 3D tunnel.

12. A system for safely terminating navigation of an unmanned aerial vehicle (UAV), comprising:
a processing circuitry; and
a memory, the memory containing instructions that, when executed by the processing circuitry, configure the system to:
generate a navigation plan for the UAV, the UAV including a propulsion system, wherein the navigation plan includes at least a start point, an end point, and a virtual three-dimensional (3D) tunnel connecting the start and end points, wherein the 3D tunnel includes a plurality of widths;
determine a path between the start point and the end point, wherein the path includes a plurality of points along the path, wherein each width of the plurality of widths of the 3D tunnel is defined based on a respective point of the plurality of points; and
configure the UAV to execute the navigation plan by navigating from the start point to the end point, wherein the UAV is configured such that the UAV executes the navigation plan by navigating from the start point to the end point, wherein the UAV is further configured such that the UAV terminates navigation by terminating power to the propulsion system of the UAV and deploying a failsafe, wherein the UAV is configured to terminate navigation when the UAV is outside of the 3D tunnel.

13. The system of claim 12, wherein the failsafe is adapted to protect the UAV from damage due to falling.

14. The system of claim 13, wherein the failsafe protects the UAV from damage due to falling by reducing drift of the UAV.

15. The system of claim 13, wherein the failsafe includes at least one of: an airbag, and a parachute.

16. The system of claim 12, wherein the UAV is configured such that the navigation is terminated at the first time in which the UAV is outside of the 3D tunnel.

17. The system of claim 12, wherein the UAV is configured such that the navigation is terminated when a total amount of time during which the UAV is outside of the 3D tunnel exceeds a threshold.

18. The system of claim 12, wherein the system is further configured to:
arm a protective deployment system of the UAV, wherein the protective deployment system of the UAV is configured to deploy the failsafe upon navigation termination when the protective deployment system is armed.

19. The system of claim 18, wherein the system is further configured to:
disarm the protective deployment system of the UAV such that the protective deployment system is configured not to deploy the failsafe upon navigation termination when the protective deployment system is disarmed.

20. The system of claim 12, wherein the system is further configured to:
define a 3D perimeter around the determined path, wherein the 3D tunnel is the 3D perimeter.

21. A non-transitory computer readable medium having stored thereon instructions for causing a processing circuitry to execute a process, the process comprising:
generating a navigation plan for the UAV, the UAV including a propulsion system, wherein the navigation plan includes at least a start point, an end point, and a virtual three-dimensional (3D) tunnel connecting the start and end points, wherein the 3D tunnel includes a plurality of widths;
determining a path between the start point and the end point, wherein the path includes a plurality of points along the path, wherein each width of the plurality of widths of the 3D tunnel is defined based on a respective point of the plurality of points; and
configuring the UAV to execute the navigation plan by navigating from the start point to the end point, wherein the UAV is configured such that the UAV executes the navigation plan by navigating from the start point to the end point, wherein the UAV is further configured such that the UAV terminates navigation by terminating power to the propulsion system of the UAV and deploying a failsafe, wherein the UAV is configured to terminate navigation when the UAV is outside of the 3D tunnel.

* * * * *